United States Patent Office 3,144,837
Patented Aug. 18, 1964

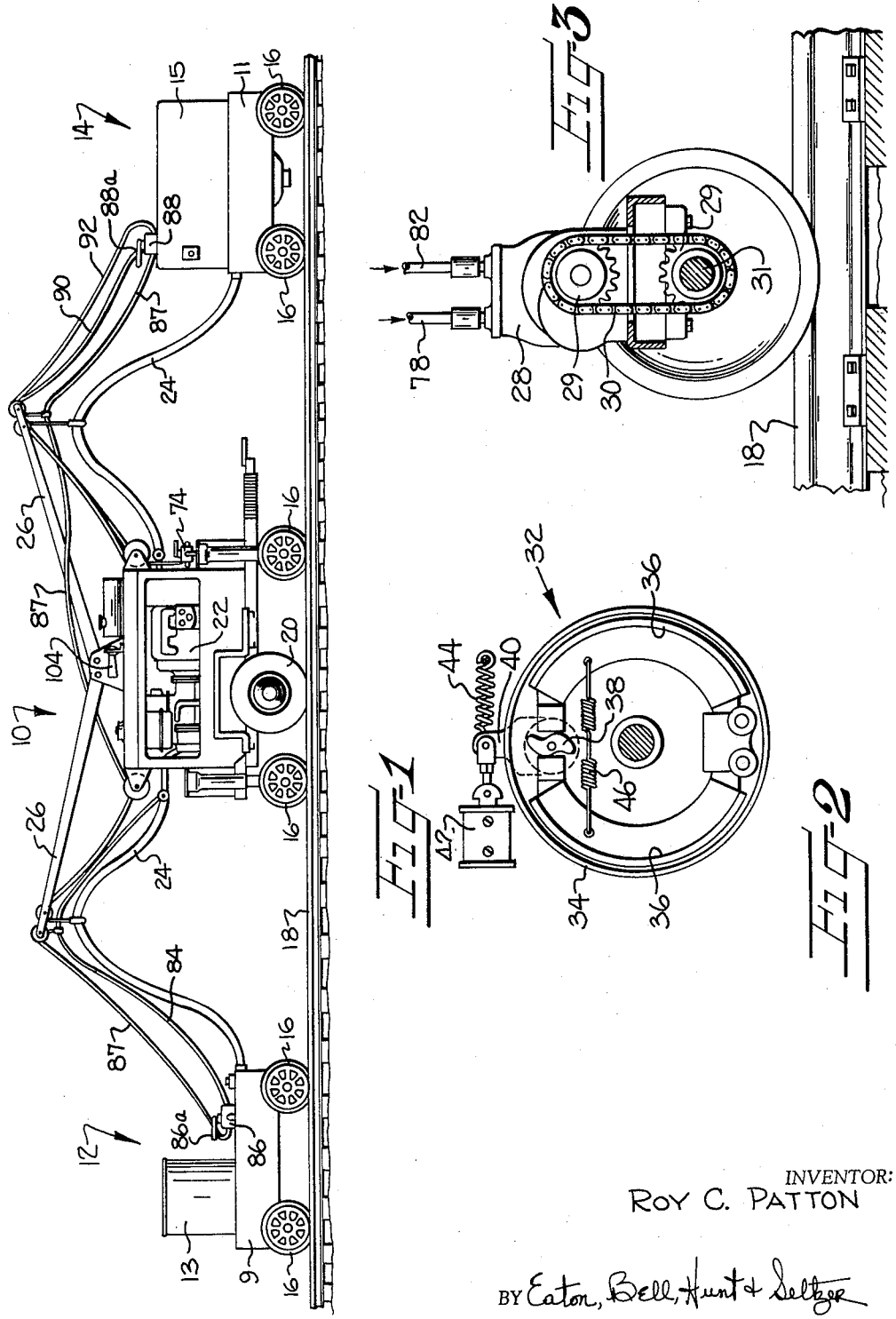

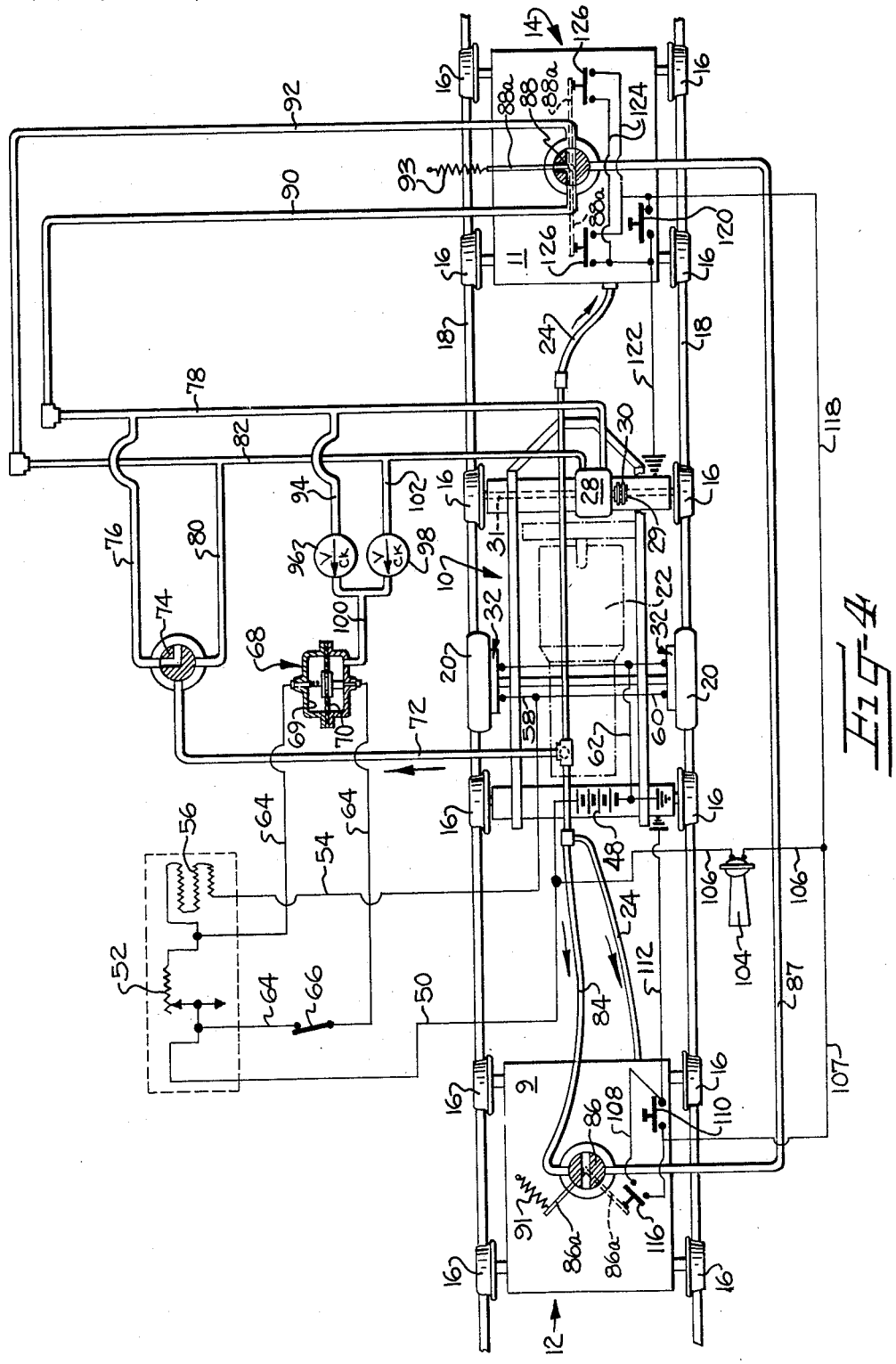

3,144,837
WORK APPARATUS FOR USE ON RAILROADS
AND THE LIKE
Roy C. Patton, Box 171, Jacksonville, Fla.
Filed Mar. 21, 1961, Ser. No. 97,270
7 Claims. (Cl. 105—1)

This invention pertains to movable work apparatus of the type employed in conjunction with the construction, maintenance and repair of railroads and the like, and more particularly to an improved control system for such apparatus.

The construction, maintenance and repair of railroad tracks and associated facilities often requires the use of basic equipment which is heavy, bulky, and relatively expensive. One such piece of equipment is an air compressor, compressed air being the usual medium employed for operating various types of axiliary equipment, such as spraying or tamping machines. To facilitate the transportation and achieve maximum utilization of a basic item of equipment such as an air compressor, it may be permanently mounted upon a self-propelled wheeled carriage or car. The compressor or other piece of basic equipment can then be moved with speed and facility to a work site where it is needed, either from a storage depot or from a previous work location, merely by driving the wheeled carriage along the railroad track. Upon arrival of the wheeled carriage unit at the work site, the desired auxiliary equipment is connected to the basic, or parent, equipment. Customarily, at a work site auxiliary equipment is located upon the railroad track both forwardly and rearwardly of the parent equipment carried by the wheeled carriage. This provides two, rather than one, work units about which workmen will be grouped, thereby affording the workmen more room in which to perform their tasks and also utilizing to a greater extent the capabilities of the parent equipment. The connections between the parent and auxiliary equipment are not rigid. Rather, flexible conduits, conducting compressed air in the case of the parent equipment being an air compressor, extend therebetween. By virtue of these flexible connections, the auxiliary equipment can be moved by the workmen along a limited length of track without the necessity of moving the wheeled carriage bearing the parent equipment. When, however, all work has been completed along a section of track spannable by the flexible conduits connecting the parent and auxiliary equipment, the entire apparatus is moved to a new, adjacent section of track at which work needs to be done. This movement of the apparatus is accomplished by workmen manually moving the auxiliary equipment, or work units, while simultaneously slowly driving the self-propelled wheeled carriage unit along the track. When the wheeled parent carriage unit has reached the middle of a new section of track, it is stopped and the workmen again begin performing the tasks for which the auxiliary equipment is suited, manually moving the auxiliary equipment as necessary within the limits imposed by the flexible conduits. This procedure is repeated until all work at a given site has been completed. At that time, the parent equipment is disconnected from the auxiliary equipment or work units and carried by its self-propelled wheeled carriage to a storage depot or another work site. The disconnected auxiliary equipment is removed from the track and stored until it is again needed.

In some instances, the auxiliary equipment is also mounted upon wheeled carriages or cars. In such instances, however, the wheeled carriages mounting auxiliary equipment are usually not self-propelled, but are merely manually movable. Only rarely does either the weight or cost of the auxiliary equipment justify providing the carriage upon which it might be mounted with a driving motor or other propelling mechanism.

While apparatus of the type described has been found to be satisfactory in affording maximum utilization of equipment, its usage has heretofore resulted all too frequently in injury to workmen and/or damage to equipment. Accidents leading to such injury and/or damage have been caused by the self-propelled parent wheeled carriage unit being driven along the track at a work site prior to the track being cleared of the connected auxiliary equipment or work units, or the workmen adjacent thereto. Such inadvertent movement of the parent wheeled carriage unit is attributable to the dual factors of the apparatus usually being employed by workmen who are customarily but semi-skilled, and by the congested conditions attendant their employment thereof. As noted heretofore, workmen are performing their tasks at work units located both forwardly and rearwardly of the parent carriage unit, which frequently prevents the workmen at one work unit from seeing the workmen at the other unit. Additionally, the noise generated by the equipment prevents audible communication between the two groups of workmen and can obscure the sound of the approaching self-propelled parent carriage unit to an extent that it is practically upon the workmen before they are aware of its movement.

Further aggravating the above situation and also contributing to the frequency of accidents has been the difficulty encountered in stopping movement of prior wheeled parent carriage units of the type described. Such units have been incapable of being rapidly brought to a halt in an emergency situation, as when workmen or auxiliary equipment are located on the track in its path of movement.

It is, accordingly, a primary object of this invention to provide apparatus of the type described which not only affords maximum utilization of equipment, but which also is safe and simple to operate. This is accomplished by the provision of a control system for a self-propelled wheeled parent carriage unit of the type described which is capable of being operated even by unskilled workmen without the likelihood of accidents or injury occurring.

A related and more specific object is the provision of apparatus of the type described in which movement of the parent wheeled carriage unit is controlled from such unit when it is disassociated from all auxiliary equipment or work units, as when traveling to and from a work site, but in which movement of the parent carriage unit is controlled jointly by the workmen at the auxiliary work units forwardly and rearwardly thereof when the entire apparatus is connected together at a work site. The joint control of the parent carriage unit by the workmen at the work units is such that neither group of workmen can initiate movement of the parent carriage unit without the knowledge and concurrence of the other group and, conversely, the workmen at either work unit can rapidly and independently stop movement of the parent wheeled carriage unit.

Still another object is the provision of apparatus of the type described having an alarm system for warning workmen of impending movement of the wheeled parent carriage unit and of any misuse of the control system for such unit, which misuse if not corrected would tend to lead to the occurrence of accidents.

Other objects will be in part evident and in part pointed out hereinafter in the following description of an illustrative embodiment of the invention, in which—

FIGURE 1 is a side elevation of the apparatus positioned upon a railroad track;

FIGURE 2 is a side elevation of one of the brake mechanisms of the wheeled parent carriage unit of the apparatus;

FIGURE 3 is a side elevation of the driving means of the wheeled parent carriage unit of the apparatus; and FIGURE 4 is a schematic plan view of the apparatus and its circuitry.

Referring more particularly to the drawings, the apparatus shown in FIGURE 1 includes a parent carriage unit 10 located between auxiliary work units 12, 14. Parent carriage unit 10 is supported by flanged wheels 16 for mounting upon and movement along a railroad track 18, and is additionally provided with a pair of pneumatic wheels 20 which also engage track 18 while unit 10 is mounted thereon. Mechanism (not shown) is provided on unit 10 for raising its flanged wheels 16 so that the unit may be supported entirely by pneumatic wheels 20, permitting unit 10 to be removed from track 18 and alternatively transported as a trailer along a road or highway, when desired. This feature, however, constitutes no part of the instant invention.

Mounted upon and integral with wheeled parent carriage unit 10 is some type of basic, parent equipment, illustratively a motor driven air compressor identified generally by the numeral 22. Extending from compressor 22 at opposite ends of parent carriage unit 10 are elongated flexible conduits 24. Booms 26 mounted atop parent carriage unit 10 support conduits 24 and maintain them above track 18, free from possible injury by wheels 16. At a work site, conduits 24 are detachably connected to any of the various types of auxiliary equipment used in the construction or maintenance of railroads and operable by compressed air from compressor 22, such as paint or chemical spraying equipment 13 or tamping equipment 15. In FIGURE 1, auxiliary equipment 13, 15 is shown mounted upon and integral with manually movable wheeled carriages 9, 11, respectively, the auxiliary equipment and manually movable carriages together defining auxiliary work units 12, 14. As noted heretofore, however, auxiliary equipment 13, 15 might be otherwise supported or merely carried by workmen rather than mounted upon wheeled carriages 9, 11. It should be understood, therefore, that the term "auxiliary work unit" as used herein is not restricted to a wheeled structure, except wherein expressly stated.

Air from compressor 22 is also employed to drive the parent carriage unit 10 with which it is integral. As shown in FIGURES 3 and 4, a reversible air motor 28 is provided on parent carriage unit 10. Suitable sprockets 29 and chain 30 drivably connect air motor 28 to the axle 31 upon which a pair of flanged wheels 16 of parent unit 10 are mounted. Upon air being supplied to motor 28 through either conduit 78 or 82 and a suitable pneumatic circuit, to be described subsequently, parent carriage unit 10 is therefore driven along track 18 either forwardly or rearwardly.

In order to bring parent carriage unit 10 to a controlled stop upon cessation of the air supply to motor 28, unit 10 is also provided with braking means, consisting of dual brake mechanisms 32. As shown in FIGURE 4, brake mechanisms 32 are disposed at and act upon pneumatic wheels 20 of parent carriage unit 10. It will be appreciated, however, that the brake mechanisms could be otherwise disposed so as to act upon one or more of the flanged wheels 16 of parent carriage unit 10, rather than upon pneumatic wheels 20. Each of the brake mechanisms 32, one of which is shown in FIGURE 2, is of a known type consisting of a brake drum 34, pivotally mounted brake shoes 36, cam 38, cam lever 40, solenoid 42, and return springs 44, 46. In FIGURE 2, brake mechanism 32 is shown in de-activated condition, with solenoid 42 de-energized and return springs 44, 46 maintaining brake shoes 36 out of engagement with brake drum 34. Upon energization of solenoid 42 by completion of a brake circuit, to be described subsequently, the plunger of solenoid 42 moves to the left as shown in FIGURE 2. Movement of the plunger of solenoid 42 to the left pivots cam lever 40 in the same direction, against the bias of return springs 44, 46, and thereby urges cam 38 into engagement with the cam surfaces upon the upper free ends of brake shoes 36. Brake shoes 36 being pivotally mounted at their lower ends, the engagement of cam 38 with the cam surfaces at the upper ends thereof urges shoes 36 into engagement with brake drum 34. Each brake mechanism 32 will remain in engaged position as long as its solenoid 42 is energized. Upon de-energization of the solenoid, return spring 44, 46 will act upon cam lever 40 and brake shoes 36 to deactivate and disengage the brake mechanism.

In using the apparatus of FIGURE 1, wheeled parent carriage unit 10 is transported to the work site either by being driven by air motor 28 along tracks 18 upon its flanged wheels 16, or by being towed along a road or highway to the area upon its pneumatic wheels 20, after which it is placed upon track 18. The desired auxiliary work units 12, 14 are then coupled to parent carriage unit 10 by conduits 24. Workmen then begin performing whatever functions for which the auxiliary equipment 13, 15 of auxiliary work units 12, 14 is adapted. As their work progresses, auxiliary work units 12, 14 are moved manually along track 18 within the limits imposed by conduits 24. When the necessary work has been completed along a section of track 18 spannable by conduits 24, the entire apparatus is moved a short distance along the track to an adjacent section. This is accomplished by manually moving the auxiliary work units 12, 14 while simultaneously activating air motor 28 upon parent carriage unit 10 to drive the parent carriage unit in the proper direction. It is during this movement of the apparatus that accidents leading to injury to workmen or damage to equipment have been found likely to occur. These accidents are primarily attributable to air motor 28 upon wheeled parent carriage unit 10 being activated to drive the parent unit before the track on both sides thereof is clear and before the workmen at either one or the other of the auxiliary work units 12, 14 are prepared for such movement. Additionally responsible for the occurrence of accidents has been the inability of the workmen to rapidly stop parent carriage unit 10 when they become aware that an emergency situation has developed through unit 10 being driven before the track is clear.

The instant invention considerably reduces, if not altogether obviates, the possibility of such accidents occurring. This is accomplished by means of circuitry, to be now described, for activating and de-activating air motor 28 and brake mechanisms 32 of parent carriage unit 10. This circuitry is best seen in FIGURE 4, to which reference is now made.

*Brake Circuitry*

Two independent brake control circuits are provided for actuating brake mechanisms 32 upon wheeled parent carriage unit 10. The first brake control circuit includes a battery 48 carried by parent carriage unit 10, line 50, variable resistance 52, line 54 including fixed resistance 56, lines 58 and 60 including solenoids 42 of brake mechanisms 32, line 62, and back to battery 48 or ground. The second brake control circuit includes battery 48, line 50, line 64 including manually operated master switch 66 and pressure responsive switch 68, line 54 including fixed resistance 56, lines 58 and 60 including solenoids 42 of brake mechanisms 32, line 62, and back to battery 48 or ground. It will be apparent that as long as either of the brake control circuits described is energized, i.e., closed, solenoids 42 of brake mechanisms 32 will be energized and maintain the brake mechanisms activated or engaged.

When moving parent carriage unit to or from a work site, the first brake control circuit described, that including variable resistance 52, is employed and the second brake control circuit is maintained de-energized and inoperative by the location of master switch 66 in an open position. During this movement to or from a work site, wheeled parent carriage unit 10 is disassociated from auxiliary work units 12, 14 and auxiliary equipment 13, 15 thereof, and is driven at a relatively rapid rate of speed. Variable resistance 52 of the first brake control circuit permits gradual braking of this rapid movement of parent carriage unit 10; as the movable terminal of resistance 52 is manually shifted from the left to the right, as seen in FIGURE 4, increasing current is supplied to solenoids 42 of brake mechanisms 32. The extent and rapidity to which brake mechanisms 32 are applied is therefore directly controllable by an operator employing resistance 52.

Upon the arrival of wheeled parent carriage unit 10 at a work site, the movable terminal of variable resistance 52 is moved to an extreme left-most position so as to open and de-energize the first brake circuit, and master switch 66 is closed. Closure of master switch 66 ordinarily energizes the second brake control circuit, inasmuch as pressure responsive switch 68 also in that circuit is biased to a normally closed position. Switch 68 comprises a chamber 69 separated into upper and lower portions by a resilient diaphragm 70. When the pressure in the upper and lower portions of chamber 69 is the same, diaphragm 70 will maintain switch 68 in a closed position. The introduction of air under pressure into the lower portion of chamber 69, in a manner to be described hereinafter, urges diaphragm 70 upwardly so as to open switch 68. Switch 68 will be maintained in an open condition, during which time the second brake control circuit is de-energized, as long as compressed air is supplied to the lower portion of chamber 69. Upon the cessation of this air supply to the lower portion of chamber 69, diaphragm 70 will automatically return switch 68 to a closed condition.

*Motor Circuitry*

In keeping with the brake control circuitry just described, there are also two distinct circuits for control of air motor 28 upon wheeled parent carriage unit 10. The first motor control circuit includes a conduit 72 leading from compressor 22 to the inlet side of a manually operable reversing valve 74, and conduits 76, 80 leading from the outlet side of valve 74 to conduits 78, 82, respectively, which communicate with air motor 28. Expended air is exhausted from motor 28 to the atmosphere. This motor control circuit, including reversing valve 74, is disposed entirely upon parent carriage unit 10 and is employed only when propelling wheeled parent carriage unit 10 independently to or from a work site. It will be apparent that the first motor control circuit can be energized and air motor 28 activated thereby merely by opening valve 74 so as to direct air from compressor 22 through either conduits 76, 78 or conduits 80, 82, depending upon the the direction in which it is desired to propel parent carriage unit 10. Upon the arrival of parent carriage unit 10 at the work site, valve 74 is closed to de-energize the first motor control circuit.

At such tie as the auxiliary work units 12, 14 are positioned forwardly and rearwardly of wheeled parent carriage unit 10 and connected to compressor 22, a second motor control circuit is established. This second motor control circuit is employed exclusively for control of motor 28 while the conected apparatus is being employed at a work site, and includes a flexible conduit 84 communicating compressor 22 upon parent carriage unit 10 and the inlet side of a valve 86 upon auxiliary work unit 12, conduit 87 communicating the outlet side of valve 86 with the inlet side of a reversing valve 88 upon auxiliary work unit 14, and conduits 90, 92 communicating the outlet side of reversing valve 88 with conduits 78, 82, respectively which lead to air motor 28. Referring to FIGURE 1, it will be apparent that the conduits of the second motor control circuit which extend between parent carriage unit 10 and auxiliary work units 12 and 14 are supported by the booms 26 in the same manner as are conduits 24, so as to maintain them above track 18 and thereby prevent possible damage thereto.

Valves 86 and 88 are manually operable by handles 86a, 88a, respectively, and are both biased, as by means of springs 91, 93, to a normally closed position. By virtue of their being arranged in series in the second motor control circuit just described, it will be apparent that when either valve 86 or valve 88 is located in its normally closed position, the second motor control circuit will be de-energized. To effect energization of the second motor control circuit and activate motor 28 thereby, both valves 86 and 88 must be opened, the resulting direction of travel of parent carriage unit 10 being dependent upon whether valve 88 is opened so as to direct air through conduits 92, 82 or through conduits 90, 78. By virtue of this arrangement, when the apparatus of FIGURE 1 is being utilized at a work site air motor 28 can be activated to drive parent carriage unit 10 only by the joint efforts of workmen at bot hauxiliary work units, but can be independently de-activated by workmen at either work unit.

*Second Brake Control Circuit Responsive to Condition of Motor Circuits*

As discussed previously, when the apparatus is connected together at a work site as shown in FIGURE 1, variable resistance 52 is in an extreme left-most position maintaining the first brake control circuit de-energized and master switch 66 is closed to maintain the second brake control circuit energized and brake mechanisms 32 activated. Inadvertent movement of parent carriage unit 10 and possible consequential injury to workman or damage to equipment is therefore prohibited, as might otherwise occur when parent carriage unit 10 is resting upon a grade or inclined section of track 18.

When parent carriage unit 10 is to be moved to a new, adjacent section of track, however, by activation of air motor 28 through energization ofthe second motor control circuit, brake mechanisms 32 must be released. The release of brake mechanisms 32 is achieved automatically, as seen in FIGURE 4, by means of conduits 94, 102 communicating conduits 78, 82, respectively, of the motor control circuits with conduit 100 leading to the lower portion of chamber 69 of switch 68 in the second brake control circuit. By virtue of this communication, upon air being supplied to motor 28 through, say, conduit 78, it will also be supplied through conduits 94, 100 to the lower portion of chamber 69, raising diaphragm 70, opening switch 68, de-energizing the second brake circuit, and de-activating brake mechanisms 32. In a similar manner, air supplied to motor 28 through conduit 82 will open pressure responsive switch 68 and de-activate brake mechanisms 32. Check valves 96, 98 are provided in conduits 94, 102, respectively, so that air conducted through either of these conduits will pass to switch 68 and not through the other conduit of the pair.

The second brake control circuit will remain deenergized and brake mechanisms 32 de-activated so long as compressed air is conducted to the lower portion of chamber 69 of switch 68. Immediately upon the cessation of this air supply, however, resilient diaphragm 70 will return to a downward position closing switch 68 and energizing the second brake control circuit to activate brake mechanisms 32. Thus, all that is required to bring parent carriage unit 10 to an abrupt stop is for the workmen at either auxiliary work unit 12 or 14 to allow biased valve 86 or 88 to return to a closed position. Simultaneous de-energization of the second motor control circuit and energization of the second brake control circuit will quickly result. It will be apparent that this capability of rapidly stopping carriage unit 10 is extremely desirable, inasmuch as it enables workmen to avoid accidents which might otherwise occur in an emergency situation. The rapid stopping of parent carriage unit 10 in this manner imposes no undue strain thereon since it is driven only relatively slowly at a work site. When parent carriage unit 10 is traveling to or from a work site, as noted heretofore, the second brake circuit is de-energized by maintaining master switch 66 open, and gradual braking is achieved through utilization of variable resistance 52 of the first brake control circuit.

Signalling and Alarm Circuitry

Mounted upon parent carriage unit 10 and operable by battery 48 thereof is a horn or other alarm device 104. Horn 104 is activatable from either auxiliary work unit 12 or 14, there being two alarm circuits connecting horn 104 with each auxiliary work unit. With respect to auxiliary work unit 12, one of the alarm circuits comprises battery 48, line 106 including horn 104, line 107, manually operable and normally open switch 110 on auxiliary work unit 12, line 112, and ground. The second alarm circuit to auxiliary unit 12 includes battery 48, line 106 including horn 104, line 107, line 108 including switch 116 operable by movement of handle 86a of valve 86, line 112, and ground.

The circuitry associating horn 104 with auxiliary work unit 14 includes a first circuit comprised of battery 48, line 106 including horn 104, line 118, manually operable and normally open switch 120 on auxiliary work unit 14, line 122, and ground. The second circuit between auxiliary work unit 14 and horn 104 includes battery 48, line 106 including horn 104, line 118, lines 124 including switches 126 operable by movement of handle 88a of valve 88 on auxiliary work unit 14, line 122 and ground.

Through the foregoing alarm circuitry, it will be appreciated that horn 104 will be activated, first, whenever either of the manually operable switches 110 or 120 are closed. Additionally, the horn will be activated whenever either valve 86 or valve 88 is opened, i.e., located in a position to supply air to motor 28 on parent carriage unit 10. The exact function of horn 104 and its circuitry are described in the following discussion of the operation of the apparatus.

Operation of the Apparatus

At the outset, parent carriage unit 10 is located in a storage area or other location distant from the work site and compressor 22 thereof is not connected to any auxiliary equipment. In this condition parent carriage unit 10 may be driven at a relatively great rate of speed along track 18 to the work site, the first motor circuit described, including reversing valve 74, being employed to activate motor 28. By turning valve 74 ninety degrees in a counterclockwise direction from its position shown in FIGURE 4, air is conducted from compressor 22 through conduits 72, 76 and 78 to air motor 28, the air operating motor 28 to drive carriage unit 10 in one direction before being exhausted from the motor to the atmosphere. Rotation of valve 74 one hundred and eighty degrees in a clockwise direction from its FIGURE 4 position conducts air from compressor 22 through conduits 72, 80, and 82 to air motor 28 so as to drive parent carriage unit 10 in the opposite direction, the expended air again being exhausted from motor 28 to the atmosphere. Before air motor 28 has been thus actuated, it is contemplated that both the first and second brake control circuits will have been previously de-energized so as to release brakes 32. The first brake control circuit is de-energized by moving variable resistance 52 to an extreme left-most position, and is again energized as necessary during the independent travel of parent unit 10 to provide controlled braking therefor. The second brake control circuit is de-energized by opening master switch 66, and by allowing that switch to remain open until such time as parent carriage unit 10 reaches the work site. Upon reaching its destination, parent carriage unit 10 is gradually stopped by closing valve 74 and gradually moving the movable terminal of resistance 52 to the right. After unit 10 is halter, the second brake control circuit is energized by closing master switch 66 and the first brake control circuit is de-energized by locating the movable terminal of resistance 52 in an extreme left-most position. Work units 12, 14 forwardly and rearwardly of parent carriage unit 10 are established by placing the auxiliary wheeled carriages mounting auxiliary equipment 13, 15 upon track 18. The various conduits and lines extending between the parent unit and auxiliary work units are coupled, quick-connect and disconnect couplings (not shown) being employed for this purpose.

With the apparatus thus associated, the workmen commence whatever duties for which the auxiliary equipment at auxiliary work units 12, 14 is adapted, employing air supplied through conduits 24 from compressor 22 for this purpose. In the performance of these duties, the workmen move the auxiliary work units 12, 14 manually along track 18 as desired within the limits imposed by conduits 24.

When the workmen at one of the auxiliary work units, for instance, unit 12, finish their duties along a section of track spannable by the conduit 24 extending to the left of unit 10, they will indicate their desire to move the entire apparatus by momentarily closing switch 110 to briefly actuate horn 104. Preferably, they will also use switch 110 to indicate to the workmen at the other unit the direction in which they wish to move along track 18. For example, switch 110 might be momentarily closed one time to sound one blast on horn 104 to indicate a desire to move along track 18 to the left as shown in FIGURE 1, and depressed two times to produce two blasts of horn 104 to indicate a desire to move along track 18 to the right.

If the workmen about auxiliary work unit 14 are ready to move the apparatus at this point, they will open valve 88 in the appropriate direction. If they are not prepared to move the apparatus, they may sound a short blast upon horn 104 by means of switch 120 to indicate that they have received the signal from the workmen gathered about auxiliary work unit 12, after which they complete their work and then open valve 88 in the appropriate direction. It will be noted that opening of valve 88 by itself will produce no movement of parent carriage unit 10, but will merely close switch 126 to produce a continuous blast upon horn 104 as long as valve 88 is open. Upon hearing this continuous blast, the workman around auxiliary unit 12 will realize that the apparatus is ready to move and will open valve 86 to energize the second motor control circuit, simultaneously de-energizing the second brake control circuit by pressure switch 68 being automatically opened. Energization of the second motor circuit activates air motor 28 and propels parent carriage unit 10 along track 18, the workman manually moving auxiliary work units 12, 14 therewith during its travel.

When parent carriage unit 10 reaches the middle of a new, adjacent section of track, either valve 86 or valve 88 can be closed by the workmen to de-energize the second motor control circuit and thereby de-activate air motor 28. De-energization of the second motor control circuit will allow diaphragm 70 of pressure switch 68 to return to its normal, downward position so as to close the second brake control circuit and activate brake mechanisms 32, thereby rapidly stopping movement of parent carriage unit 10. Horn 104, which has been continuously activated while the apparatus was being moved, will be de-activated only when both valve 86 and valve 88 have been allowed to return to closed position. This feature eliminates the possibility of either valve 86 or 88 being unknowingly wedged or held in an open position, in which event parent carriage unit 10 could be driven by independent manipulation of the other valve, as might occur by tools or other materials being stacked indiscriminately in proximity thereto.

It will be apparent from the foregoing description that the instant invention provides apparatus possessing the various objects and advantages heretofore set forth. When in use at a work site, parent carriage unit 10 of the apparatus is driven only by opening of both valves 86 and 88. Since these valves are biased to a normally closed position and since horn 104 sounds a continuous warning if either valve is inadvertently maintained in an open position, it is impossible for workmen at either of the work units 12, 14 to propel unit 10 without the knowledge and concurrence of the workmen at the other work unit. Moreover, in an emergency situation movement of parent carriage unit 10 can be rapidly halted by workmen at either of the work units merely by closing either valve 86 or 88. Allowing either of these valves to close not only de-activates motor 28, but additionally activates brake mechanisms 32 to abruptly halt unit 10 and maintain it against further movement, even if parent carriage unit 10 should at that time be upon a grade or unlevel section of track 18. The apparatus is simple in its construction and operation and therefore can be operated even by unskilled workmen, there being but a single control device at each work station, but is highly effective at preventing accidents which might otherwise occur.

In the drawings and specification there has been set forth a preferred embodiment of the invention and, although specific terms are employed, they are used in a generic and descriptive sense only and not for purposes of limitation, the scope of the invention being defined in the claims.

I claim:

1. Work apparatus for use on railroads and the like comprising a wheeled parent carriage unit positioned upon a railroad track, a pair of auxiliary work units positioned upon the track in spaced relation to said parent carriage unit, motor means on said parent carriage unit effective upon activation to propel said parent carriage unit along the track, control devices at said auxiliary work units movable between first and second positions, said control devices being operatively connected to said motor means for de-activating and activating the same, said motor means being de-activated by location of either of said control devices in said first position thereof, and said motor means being activated to propel said parent carriage unit by location of said control devices at both of said auxiliary work units in said second positions thereof.

2. Work apparatus for use on railroads and the like comprising a wheeled parent carriage unit positioned upon a railroad track, a pair of auxiliary work units positioned upon the track forwardly and rearwardly of said parent carriage unit, motor means on said parent carriage unit effective upon activation to propel said parent carriage unit along the track, brake means on said parent carriage unit effective upon activation to maintain said parent carriage unit against movement, control devices at said auxiliary work units movable between first and second positions, said control devices being operatively connected to said motor means and said brake means for de-activating and activating the same, location of either of said control devices in said first position thereof de-activating said motor means and activating said brake means, and location of said control devices at both of said auxiliary work units in said second positions thereof activating said motor means and de-activating said brake means.

3. Apparatus as in claim 2, wherein said control devices are resiliently maintained in said first positions thereof.

4. Apparatus as in claim 2, and further including alarm means on said parent carriage unit effective when activated to produce an alarm signal, and wherein said control devices are operatively connected to said alarm means for de-activating and activating the same, location of either of said control devices in said second position thereof activating said alarm means to produce an alarm signal.

5. Work apparatus for use on railroads and the like comprising a wheeled parent carriage unit positioned upon a railroad track, a pair of wheeled auxiliary work units positioned upon the track forwardly and rearwardly of said parent carriage unit, motor means on said parent carriage unit effective upon activation to propel said parent carriage unit along the track between said auxiliary work units, brake means on said parent carriage unit effective upon activation to maintain said parent carriage unit against movement, a motor control circuit operatively connected to said motor means effective upon energization to activate said motor means and upon de-energization to de-activate said motor means, a brake control circuit operatively connected to said brake means effective upon energization to activate said brake means and upon de-energization to de-activate said brake means, control devices on said auxiliary carriage units movable between first and second positions, said motor control circuit operatively connected to said control devices and being energized and de-energized thereby, said motor control circuit being de-energized by location of either of said control devices in said first position thereof, said motor control circuit being energized by location of said control devices at both of said auxiliary work units in said second positions thereof, and switch means in said brake control circuit operatively connected to said motor control circuit and responsive to energization and de-energization thereof, said switch means energizing said brake control circuit upon de-energization of said motor control circuit and de-energizing said brake control circuit upon energization of said motor control circuit.

6. Apparatus as in claim 5, and further including alarm means on said parent carriage unit effective when activated to produce an alarm signal, alarm control circuits operatively connected to said alarm means and effective when energized to activate said alarm means, alarm switches in said alarm circuits operable by said control devices on said auxiliary work units, location of either of said control devices in said second position thereof actuating one of said alarm switches to energize one of said alarm control circuits and thereby activate said alarm means to produce an alarm signal.

7. Work apparatus for use on railroads and the like comprising air compressor equipment, a parent wheeled carriage mounting said air compressor equipment for positioning upon and movement along a railroad track, auxiliary railroad work equipment operable by compressed air, a pair of auxiliary wheeled carriages mounting said auxiliary work equipment upon and for movement along the railroad track at a work site forwardly and rearwardly of said parent wheeled carriage, elongated flexible conduits detachably connecting said air compressor equipment and said auxiliary work equipment at a work site for supplying compressed air to said auxiliary equipment, a reversible air motor on said parent wheeled carriage drivably engaging a pair of wheels thereof and effective upon activation to propel said parent wheeled carriage along the track, brake means on said parent wheeled carriage operatively connected to a pair of wheels thereof and effective upon activation to maintain said parent wheeled carriage against movement, first and second pneumatic motor control circuits each operatively connected to said air compressor equipment and said reversible air motor and each effective upon energization to activate said reversible air motor, first and second brake control circuits each operatively connected to said brake means and each effective upon energization to activate said brake means, reversing valve means on said parent wheeled carriage movable between open and closed positions, said first pneumatic motor control circuit operatively connected to said reversing valve means and being de-energized by location of said reversing valve means in a closed position and energized by location of said reversing valve means in an open position, variable resistance switch means on said parent wheeled carriage movable between open and closed positions, said first brake control circuit operatively connected to said variable resistance switch means and being energized by location of said variable resistance switch means in a closed position and de-energized by location of said variable resistance switch means in an open position, said first pneumatic motor control circuit and said first brake control circuit being employed while propelling said parent wheeled carriage to and from a work site, said first pneumatic motor control circuit and said first brake control circuit being de-energized at a work site by location of said reversing valve means in a closed position and location of said variable resistance switch means in an open position, control valves on said auxiliary wheeled carriages movable between closed and open positions, said second pneumatic motor control circuit being completed upon arrival of said parent wheeled carriage at a work site and being operatively connected to said control valves on said auxiliary wheeled carriages, said second pneumatic motor control circuit being de-energized by location of either of said control valves in said closed position thereof, said second pneumatic motor control circuit being energized by location of said control valves on both of said auxiliary wheeled carriages in said open positions thereof, switch means in said second brake circuit biased to a normally closed position and movable in response to pneumatic pressure to an open position, conduit means communicating said pressure responsive switch means and said second pneumatic motor control circuit, said second brake control circuit being normally energized at a work site by location of said pressure responsive switch means in said normally closed position thereof and being de-energized at a work site by energization of said second pneumatic motor control circuit opening said pressure responsive switch means, alarm means on said parent wheeled carriage effective upon activation to produce an alarm signal, alarm switches movable between open and closed positions operatively connected to said control valves on said auxiliary wheeled carriages, a pair of alarm control circuits each operatively connected to said alarm means and one of said alarm switches and each effective upon energization to activate said alarm means, location of either of said control valves in said open position thereof closing said corresponding alarm switch and energizing said corresponding alarm control circuit to activate said alarm means, and location of either of said control valves in said closed position thereof opening said corresponding alarm switch and de-energizing said corresponding alarm control circuit.

References Cited in the file of this patent

UNITED STATES PATENTS

| | | |
|---|---|---|
| 2,028,768 | Eksergian | Jan. 28, 1936 |
| 2,676,549 | Richardson | Apr. 27, 1954 |
| 2,976,816 | Plasser et al. | Mar. 28, 1961 |
| 2,999,467 | Knippel | Sept. 12, 1961 |
| 3,000,099 | Hayes | Sept. 19, 1961 |

FOREIGN PATENTS

| | | |
|---|---|---|
| 204,588 | Austria | July 25, 1959 |
| 497,654 | Great Britain | Dec. 21, 1938 |